(12) United States Patent
Zhang

(10) Patent No.: US 8,566,388 B2
(45) Date of Patent: Oct. 22, 2013

(54) METHOD AND APPARATUS FOR MANAGING NUMEROUS MESSAGES

(75) Inventor: Li Zhang, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 13/699,662

(22) PCT Filed: Aug. 25, 2011

(86) PCT No.: PCT/CN2011/078920
§ 371 (c)(1),
(2), (4) Date: Nov. 23, 2012

(87) PCT Pub. No.: WO2012/025058
PCT Pub. Date: Mar. 1, 2012

(65) Prior Publication Data
US 2013/0066879 A1    Mar. 14, 2013

(30) Foreign Application Priority Data
Aug. 26, 2010   (CN) .......................... 2010 1 0265422

(51) Int. Cl.
G06F 15/16   (2006.01)
G06F 17/00   (2006.01)
G06F 17/30   (2006.01)

(52) U.S. Cl.
USPC ............................ 709/202; 707/673; 707/715

(58) Field of Classification Search
USPC .................................. 709/202; 707/673, 715
See application file for complete search history.

(56) References Cited

U.S. PATENT DOCUMENTS

| 6,483,604 | B1 * | 11/2002 | Gerstenberger | 358/1.17 |
| 7,043,506 | B1 * | 5/2006 | Horvitz | 707/661 |
| 2004/0243774 | A1 * | 12/2004 | Horvitz | 711/161 |
| 2006/0235878 | A1 * | 10/2006 | Shipp et al. | 707/104.1 |
| 2009/0210586 | A1 * | 8/2009 | Tanabe | 710/52 |
| 2009/0240763 | A1 * | 9/2009 | Hones et al. | 709/203 |

FOREIGN PATENT DOCUMENTS

| CN | 1722671 A | 1/2006 |
| CN | 1723458 A | 1/2006 |
| CN | 101236564 A | 8/2008 |
| CN | 101243449 A | 8/2008 |

OTHER PUBLICATIONS

First Chinese Office Action dated Sep. 5, 2012; Appln. 201010265422.3.
International Search Report mailed Nov. 24, 2011; PCT/CN2011/078556.

* cited by examiner

*Primary Examiner* — Hieu Hoang
(74) *Attorney, Agent, or Firm* — Ladas & Parry LLP

(57) ABSTRACT

A method and apparatus for managing numerous messages are provided. The method includes: A. pulling, by a client terminal, a message index list from a server; B. pulling, by the client terminal, message bodies corresponding to message indexes in the message index list in batches; C. managing, by the client terminal, the pulled message bodies and message indexes by using a message pool mode; D. after receiving a finish indication triggered by a user, storing, by the client terminal, the message indexes and the message bodies in the message pool to a local disk. By using the present invention, numerous messages are managed.

8 Claims, 2 Drawing Sheets

METHOD AND APPARATUS FOR MANAGING NUMEROUS MESSAGES

FIELD OF THE INVENTION

The present invention relates to Internet technologies, and more particularly to a method and apparatus for managing numerous messages.

BACKGROUND OF THE INVENTION

Currently, in both entertainment and normal work life, Instant Messaging (IM) tools have become indispensable software tools of users, because of the advantages of the IM tools, e.g. usability, stability and security. By using the IM tools, two chat modes are mainly implemented, a separate chat mode in which one-to-one chats are performed and a group chat mode in which one-to-multiple chats are performed.

With the development of Internet technologies, applications of micro-blogs are developed increasingly. By using the micro-blog, users can express themselves through micro-blog articles, and can also understand other users by reading micro-blog articles of other users. In this way, one person can transmit messages to infinite persons, and one person can receive messages from infinite persons. Hence, the micro-blog has a large number of listeners which are much larger than the number of listeners supported by conventional IM tools. By using the micro-blog, the chat modes are developed from one-to-one and one-to-multiple which are supported by the IM tool to one-to-infinite.

Because the micro-blog has large numbers of listeners, there are also numerous messages. However, no method is provided for managing numerous messages, which is a technical problem to be solved currently.

SUMMARY OF THE INVENTION

The embodiments of the present invention provide a method and apparatus for managing numerous messages, so as to implement management of numerous messages.

A method for managing numerous messages includes:

A. pulling, by a client terminal, a message index list from a server;

B. pulling, by the client terminal, message bodies corresponding to message indexes in the message index list in batches;

C. managing, by the client terminal, the pulled message bodies and the message indexes corresponding to the message bodies by using a message pool mode;

D. after receiving a finish indication triggered by a user, storing, by the client terminal, the message indexes and the message bodies in the message pool to a local disk.

An apparatus for managing numerous messages includes:

a list pulling module, adapted to pull a message index list from a server;

a message body pulling module, adapted to pull message bodies corresponding to message indexes in the message index list in batches;

a managing module, adapted to manage the pulled message bodies and the message indexes corresponding to the message bodies by using a message pool mode;

a storing module, adapted to store the message indexes and the message bodies in the message pool to a local disk, after receiving a finish indication triggered by the user.

As can be seen from the above technical solutions, in the embodiments of the present invention, the message index list is pulled from the server, and the message bodies are pulled from the server according to the message indexes in the message index list, so that numerous messages are pulled. By storing the message indexes and the message bodies in the message pool, the numerous messages are managed centralized and the problem of memory occupying of the numerous message is solved. By storing the message indexes and the message bodies which are stored in the message pool to the local disk, the numerous messages are stored locally, and the numerous messages are managed.

DETAILED DESCRIPTION OF THE INVENTION

In order to make the object, technical solution and merits of the present invention clearer, the present invention will be illustrated in detail hereinafter with reference to the accompanying drawings and specific examples.

Because the number of users related to conventional IM tools is relatively small, so does the number of messages. But applications similar to a micro-blog relate to a large number of users, and the number of messages is increased greatly, which can not be managed by using methods for managing the messages of the conventional IM tools. Therefore, the embodiments of the present invention provide a method for managing numerous messages, which is shown in FIG. 1.

Figure 1:
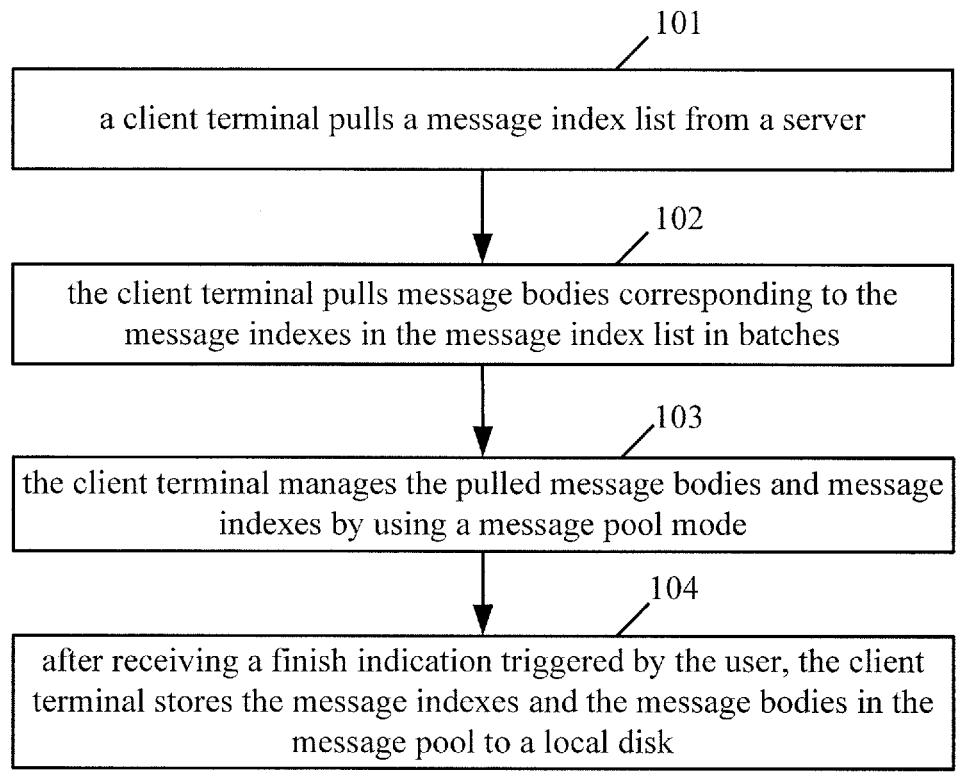
FIG. 1 is a flowchart illustrating an embodiment of the present invention.

FIG. 1 is a basic flowchart illustrating an embodiment of the present invention. As shown in FIG. 1, the method includes the following operations.

In block 101, a client terminal pulls a message index list from a server.

In the block 101, the operation of pulling the message index list, which is performed by the client terminal, is trigged by a user. The operation is described in detail by taking the micro-blog as an example. If a current location of the user is a home page of the micro-blog, after receiving the triggering of the user from the home page, the client terminal sends the triggering to the server. After receiving the triggering, the server arranges message indexes corresponding to messages to be displayed on the home page according to a time sequence, and sends the arranged message indexes to the client terminal. The messages to be displayed on the home page includes, e.g. messages sent by uses followed by the user currently, and messages obtained through an IM relation chain.

It should be noted that, before the pulling operation in the block 101 is performed, it needs to determine whether the last pulling operation is finished, if the last pulling operation is finished, the pulling operation in the block 101 is performed, otherwise, the current flow is terminated.

In block 102, the client terminal pulls message bodies corresponding to the message indexes in the message index list in batches.

It should be noted that, the operations in the block 102 may be performed immediately after the client terminal pulls the message index list, or may be performed later, which is not limited in the present invention.

In block 103, the client terminal manages the pulled message bodies and message indexes by using a message pool mode.

In block 104, after receiving a finish indication triggered by the user, the client terminal stores the message indexes and the message bodies in the message pool to a local disk.

And thus, the basic flow shown in FIG. 1 is finished.

In the embodiment, the managements of the numerous messages mainly include three aspects, which are pulling the numerous messages, occupying memory for the numerous messages and storing the numerous messages locally. Based on the flow shown in FIG. 1, the three aspects are described respectively.

(1) Pulling the Numerous Messages

In the embodiments of the present invention, pulling the numerous messages is implemented via blocks 101 and 102. Specifically, pulling message bodies corresponding to the message indexes in the message index list in batches performed in block 102 includes: B1, selecting N message indexes from the message index list; B2, the client terminal pulling message body corresponding to each of the selected message indexes from the server; B3, after the pulling operation in B2, the client terminal determining whether all of the message indexes in the message index list are selected; if all of the message indexes in the message index list are selected, the block 101 is returned to when a configured time point (which may be the time point when the user triggers the client terminal to pull the message index list) arrives; otherwise, B4 is performed; B4, if the number of the not selected message indexes in the message index list is larger than or equal to N, selecting N message indexes from the not selected message indexes, and performing B2; if the number of the not selected message indexes in the message index list is smaller than N, selecting the not selected message indexes, and performing B2; N is an integer and larger than 1.

The client terminal pulling message body corresponding to each of the selected message indexes from the server comprises: the client terminal sending the selected message indexes to the server; the server searches out each message body corresponding to each of the message indexes, and sends a message packet carrying the searched out message bodies to the client terminal.

As can be seen, the server sends the message bodies to the client via the message packet. Preferably, in order to use the message packet effectively, the message packet carries the message bodies by using a maximum capability. For example, if the maximum capability of the message packet is 800 bytes, try to ensure that the messages every time sent by the server occupy 800 bytes, so as to improve sending efficiency of the message packets. Therefore, the value of N is determined according to the maximum capability of the message packet sent by the server. Generally, one message packet at best includes four message bodies corresponding to the message indexes, and thus the value of N is 4.

(2) Occupying Memory for the Numerous Messages

In the embodiments of the present invention, occupying memory for the numerous messages is implemented via block 103. Specifically, the block 103 includes: for each pulled message body, determining whether the message pool has stored the message body, if the message pool does not stored the message body, storing the message body and the message index corresponding to the message body in the message pool; if the message pool has stored the message body, discarding the message body. Therefore, when different pages need to represent the same message body, only one message body occupies the memory of the message pool, thereby saving the resources of the message pool.

In addition, in the embodiments of the present invention, the message indexes and the messages are managed together by using the message pool, rather than that the message list is managed in each page control or logic management class, thereby implementing centralized management of the messages.

(3) Storing the Numerous Messages Locally

Because the size of the IM messages is not large, the IM message can be completely stored locally. If the messages of the products such as the micro-blog are also stored locally, local data stiles will expand increasingly and performances of reading files will be affected because of the large number of messages. In order to solve the above problem, the following operations are performed to solve the problem of memory occupation of the numerous messages:

when the message bodies are stored in the message pool, calculating a sum of the number of message bodies to be stored in the message pool currently and the number of message bodies stored in the message pool; determining whether the sum is larger than M (the message pool at best stores M message bodies); if the sum is not larger than M, storing the message bodies to be stored in the message pool directly; if the sum is larger than M, cleaning the message pool, so as to make the message pool be able to store the message bodies to be stored in the message pool currently, and then storing the current message bodies to be stored in the message pool. For example, if the message pool at best stores 500 message bodies, and the number of the current message bodies to be stored in the message pool is 40, and the number of the message bodies stored in the message pool is 480, the sum of the above two numbers is larger than 500, and thus the message pool is cleaned so as to make the message pool be able to store the message bodies to be stored in the message pool currently. For example, 20 or more than 20 message bodies are cancelled from the message pool, and then the current message bodies to be stored in the message pool are stored in the message pool.

As can be seen, after the above operations, it is ensured that the message pool at best stores M message bodies at each moment.

If the finish indication trigged by the user is received, e.g. the user quits the micro-blog page, the message bodies stored in the message pool are directly stored in the local disk, so as to solve the problem of storing the numerous messages locally.

There are multiple modes to clean the message pool, one of the multiple modes includes: cleaning the message pool according to time indications of the message bodies, and/or according to an indication indicating whether the message bodies are displayed. For example, when the message pool is cleaned according to the time indications of the message bodies, the message bodies are arranged according to the time sequence of the time indications, and the message bodies arranged in the front of all the message bodies are cancelled to make the message pool be able to store the current message bodies to be stored.

Generally, the message includes user information (e.g. a user identification, a nick name, and a relationship chain etc.) and text information (also called as naked information). Hence, in the embodiments of the present invention, the naked information is parsed to obtain other information needed to be pulled, e.g. information issued by other users mentioned in the naked information, similarly with the above pulling operations, parts of the whole message which relate to resources are pulled and combined, and is presented by using an extension mode and a callback mode.

The method provided by the embodiments of the present invention is described above, and the apparatus provided by the embodiments of the present invention will be described herein.

Figure 2:
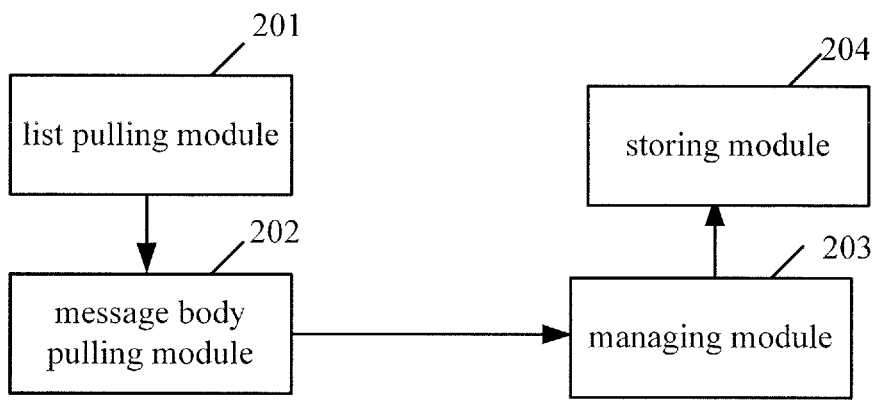
FIG. 2 is a basic schematic diagram illustrating an apparatus according to an embodiment of the present invention.

FIG. 2 is a basic schematic diagram illustrating an apparatus according to an embodiment of the present invention. As shown in FIG. 2, the apparatus includes a list pulling module 201, a message body pulling module 202, a managing module 203 and a storing module 204.

The list pulling module 201 is adapted to pull a message index list from a server.

The message body pulling module 202 is adapted to pull message bodies corresponding to message indexes in the message index list in batches.

The managing module 203 is adapted to manage the pulled message bodies and message indexes by using a message pool.

The storing module 204 is adapted to store the message indexes and the message bodies in the message pool to a local disk, after receiving a finish indication triggered by the user.

The apparatus provided by the embodiments of the present invention is described basically as above.

Figure 3:
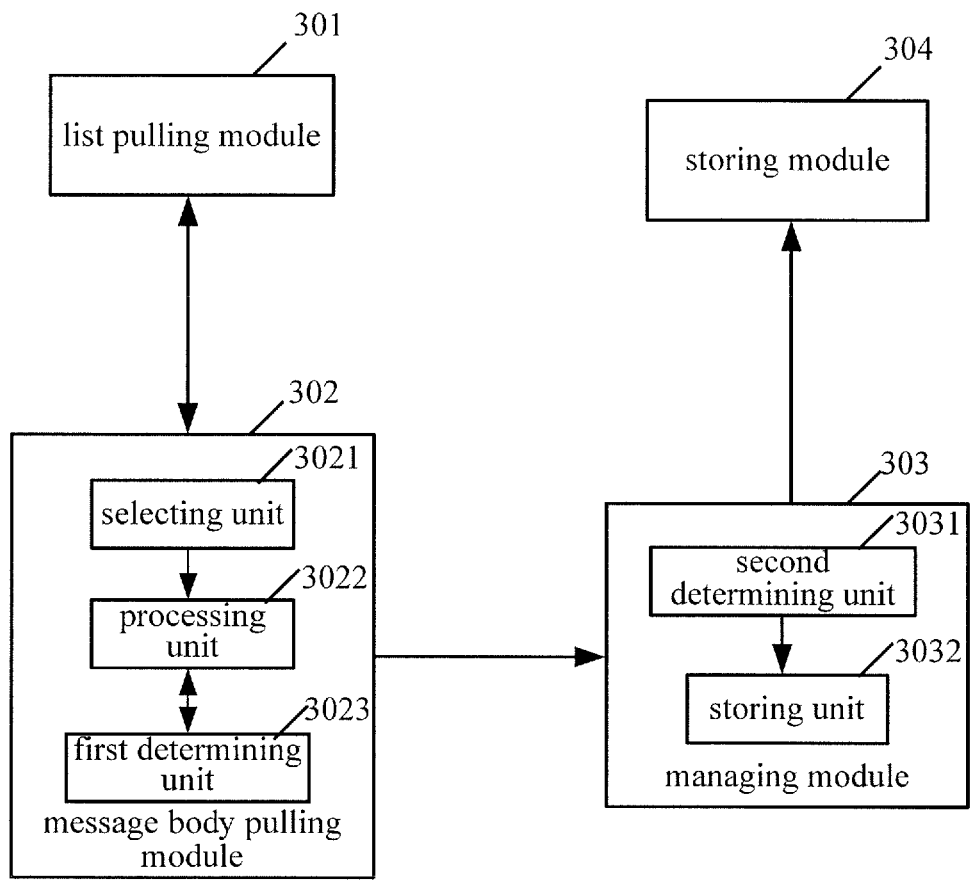
FIG. 3 is a detailed schematic diagram illustrating an apparatus according to an embodiment of the present invention.

FIG. 3 is a detailed schematic diagram illustrating an apparatus according to an embodiment of the present invention. As shown in FIG. 3, the apparatus includes a list pulling module 301, a message body pulling module 302, a managing module 303 and a storing module 304. the functions of the list pulling module 301, the message body pulling module 302, the managing module 303 and the storing module 304 are similar with the functions of the list pulling module 201, the message body pulling module 202, the managing module 203 and the storing module 204, and will not be described herein.

Preferably, in the embodiment, the message body pulling module 302 includes:

a selecting unit 3021, adapted to select N message indexes from the message index list;

a processing unit 3022, adapted to pull the message body corresponding to each of the selected message indexes from the server;

a first determining unit 3023, adapted to determine whether all of the message indexes in the message index list are selected after the processing unit 3022 finishes the pulling operation; if all of the message indexes in the message index list are selected, trigger the list pulling module 301 to perform the pulling operation when a configured time point arrives; if not all of the message indexes in the message index list are selected, if the number of the not selected message indexes in the message index list is larger than or equal to N, select N message indexes from the not selected message indexes, and trigger the processing unit 3022 to perform the pulling operation; if the number of the not selected message indexes in the message index list is smaller than N, select the not selected message indexes, and trigger the processing unit 3022 to perform the pulling operation; N is an integer and larger than 1.

When the processing unit 3022 pulls the message body corresponding to each of the selected message indexes from the server, the processing unit 3022 is specifically adapted to, send the selected message index to the server; receive the messages sent by the server via a message packet.

Preferably, the management module 303 includes:

a second determining unit 3031, for each message body pulled by the message body pulling module, adapted to determine whether the message pool has stored the message body;

a storing unit 3032, adapted to, when the second determining unit 3031 determines that the message pool does not stored the message body, store the message body and the message index corresponding to the message body in the message pool.

In the embodiment, the message pool at best stores M message bodies. In order to ensure that the message pool always store M or less than M message bodies, the storing operation of the storing unit 3032 specifically includes: calculating a sum of the number of message bodies to be stored in the message pool currently and the number of message bodies stored in the message pool; determining whether the sum is larger than M; if the sum is larger than M, cleaning the message pool, so as to make the message pool be able to store the message bodies to be stored in the message pool currently, and then storing the current message bodies to be stored in the message pool.

The apparatus provided by the embodiments of the present invention is described above.

As can be seen from the above technical solutions, the message index list is pulled from the server, and the message bodies are pulled from the server according to the message indexes in the message index list, so that numerous messages are pulled. By storing the message indexes and the message bodies in the message pool, the numerous messages are managed centralized and the problem of memory occupying of the numerous message is solved. By storing the message indexes and the message bodies stored in the message pool to the local disk, the numerous messages are stored locally, and the numerous messages are managed.

The foregoing is only preferred embodiments of the present invention. It should be noted that those skilled in the art may make improvement and modification within the principle of the present invention, and the improvement and modification should be covered in the protection scope of the invention.

The invention claimed is:

1. A method for managing numerous messages, comprising:
   A. pulling, by a client terminal, a message index list from a server;
   B. pulling, by the client terminal, message bodies corresponding to message indexes in the message index list in batches;
   C. managing, by the client terminal, the pulled message bodies and the message indexes corresponding to the message bodies by using a message pool;
   D. after receiving a finish indication triggered by a user, storing, by the client terminal, the message indexes and the message bodies in the message pool to a local disk;
   wherein the step B comprises:
   B1. selecting N message indexes from the message index list;
   B2. pulling, by the client terminal, the message body corresponding to each of the selected message indexes from the server;
   B3. after the pulling operation in B2, determining, by the client terminal, whether all of the message indexes in the message index list are selected; if all of the message indexes in the message index list are selected, the step A is returned to; if not all of the message indexes in the message index list are selected, B4 is performed;
   B4. if the number of not selected message indexes in the message index list is larger than or equal to N, selecting N message indexes from the not selected message indexes, and performing B2; if the number of the not selected message indexes in the message index list is smaller than N, selecting the not selected message indexes, and performing B2;

N is an integer and is more than 1.

2. The method of claim 1, wherein the pulling operation in step B2 comprises:
sending, by the client terminal, the selected message indexes to the server;
searching out, by the server, each message body corresponding to each of the message indexes, and sending a message packet carrying the searched out message bodies to the client terminal;
the value of N being determined according to a maximum capability of the message packet sent by the server.

3. The method of claim 1, wherein the step C comprises:
for each pulled message body, determining whether the message pool has stored the message body, if the message pool does not stored the message body, storing the message body and the message index corresponding to the message body in the message pool.

4. The method of claim 3, wherein the message pool at best stores M message bodies; and
storing the message body in the message pool comprises:
calculating a sum of the number of message bodies to be stored in the message pool currently and the number of message bodies stored in the message pool;
determining whether the sum is larger than M; if the sum is larger than M, cleaning the message pool to make the message pool be able to store the message bodies to be stored in the message pool currently; storing the current message bodies to be stored in the message pool.

5. The method of claim 4, wherein cleaning the message pool comprises:
cleaning the message pool according to time indications of the message bodies, and/or according to an indication indicating whether the message bodies are displayed.

6. An apparatus for managing numerous messages, comprising:
a processor for executing instructions stored in a memory, the instructions comprise:
a list pulling instruction to pull a message index list from a server;
a message body pulling instruction to pull message bodies corresponding to message indexes in the message index list in batches;
a managing instruction to manage the pulled message bodies and the message indexes corresponding to the message bodies by using a message pool;
a storing instruction to store the message indexes and the message bodies in the message pool to a local disk, after receiving a finish indication triggered by the user;
wherein the message body pulling instruction comprises:
a selecting instruction to select N message indexes from the message index list;
a processing instruction to pull the message body corresponding to each of the selected message indexes from the server;
a first determining instruction to determine whether all of the message indexes in the message index list are selected after the processing instruction finishes the pulling operation;
if all of the message indexes in the message index list are selected, trigger the list pulling instruction to perform the pulling operation when a configured time point arrives; if not all of the message indexes in the message index list are selected, if the number of not selected message indexes in the message index list is larger than or equal to N, select N message indexes from the not selected message indexes, and trigger the processing instruction to perform the pulling operation; if the number of the not selected message indexes in the message index list is smaller than N, select the not selected message indexes, and trigger the processing instruction to perform the pulling operation;
N is an integer and is larger than 1.

7. The apparatus of claim 6, wherein management instruction comprises:
a second determining instruction, for each message body pulled by the message body pulling instruction, adapted to determine whether the message pool has stored the message body;
a storing instruction, adapted to, when the second determining instruction determines that the message pool does not stored the message body, store the message body and the message index corresponding to the message body in the message pool.

8. The apparatus of claim 7, wherein the message pool at best stores M message bodies; and
the storing instruction is adapted to calculate a sum of the number of message bodies to be stored in the message pool currently and the number of message bodies stored in the message pool; determine whether the sum is larger than M; if the sum is larger than M, clean the message pool to make the message pool be able to store the message bodies to be stored in the message pool currently, and store the current message bodies to be stored in the message pool.

* * * * *